United States Patent
Brocheton et al.

(10) Patent No.: US 6,420,290 B1
(45) Date of Patent: *Jul. 16, 2002

(54) COLORLESS INORGANIC GLASS

(75) Inventors: Yves A. H. Brocheton, Fontenay-sous-Bois; Christophe Remy, Thomery, both of (FR)

(73) Assignee: Corning S.A., Avon Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/502,814

(22) Filed: Feb. 11, 2000

(30) Foreign Application Priority Data

Feb. 12, 1999 (FR) .............................. 99 01700

(51) Int. Cl.[7] .................. C03C 3/068; C03C 3/095; C03C 4/08

(52) U.S. Cl. ................ 501/64; 501/56; 501/58; 501/59; 501/65; 501/67; 501/78; 501/903; 501/905

(58) Field of Search .................. 501/56, 58, 59, 501/64, 65, 67, 78, 903, 905

(56) References Cited

U.S. PATENT DOCUMENTS

| 5,281,562 A | * | 1/1994 | Araujo et al. | 501/32 |
| 5,322,819 A | * | 6/1994 | Araujo et al. | 501/13 |
| 5,627,676 A | * | 5/1997 | Borelli et al. | 359/483 |
| 5,932,501 A | * | 8/1999 | Brocheton | 501/64 |

FOREIGN PATENT DOCUMENTS

| EP | 0 579 945 A | 1/1994 |
| EP | 0 586 948 A | 3/1994 |
| EP | 0 715 190 A | 6/1996 |
| WO | WO 97 14661 A | 4/1997 |

* cited by examiner

Primary Examiner—Karl Group
(74) Attorney, Agent, or Firm—Milton M Peterson

(57) ABSTRACT

The object of the present invention is colorless inorganic glasses, as well as products manufactured from said glasses. Said glasses are of the type containing copper halides or copper cadmium halides and having a sharp optical absorption cutoff between 370 nm and 425 nm essentially having the composition below, expressed in cationic percentages:

| | | |
|---|---|---|
| | 23–73% | $SiO_2$ |
| | 15–45% | $B_2O_3$ |
| | 0–24% | $Al_2O_3$ |
| | 0–12% | $Li_2O$ |
| | 0–20% | $Na_2O$ |
| | 0–12% | $K_2O$ |
| | 0–5% | $CaO + BaO + SrO$ |
| | 0.125–1% | $Cu_2O$ |
| | 0–1% | $CdO$ |
| | 0–5% | $ZrO_2$ |
| with | 0–1.75% | Cl ⎤ |
| | 0–2% | Br ⎦ 0.25–2% Cl + Br |
| and | 0–2% | F; | the Cl, Br and F contents being themselves expressed in percentages by weight of the total composition;

with an adequate amount of reducing agent(s) which is (are) advantageously selected from $SnO_2$, $As_2O_3$, $Sb_2O_3$, and mixtures thereof, in order to have mainly, in said glasses, the copper in the form of cuprous ions ($Cu^+$), and therefore glasses which have neither a red coloration, nor a blue green coloration;

and the residual yellow coloration of which is minimized.

10 Claims, 2 Drawing Sheets

COLORLESS INORGANIC GLASS

FIELD OF THE INVENTION

The field of the present invention is colourless inorganic glasses which have a sharp optical absorption cutoff between 370 nm and 425 nm, as well as products manufactured from said glasses.

BACKGROUND OF THE INVENTION

Such glasses, which are non-photochromic, and which are absorbers (of UV) up to a given wavelength beyond which, abruptly, they exhibit a maximum transmission (in the visible, around 400 nm), are known to the person skilled in the art.

They contain in their composition copper halides or copper cadmium halides. These elements, by precipitating in the form of micro-crystals, generally at the end of a thermal treatment of the glass prepared beforehand, are responsible for the particular properties of absorption of said glasses.

Such glasses have especially been described in the U.S. Pat. Nos. 5,281,562 and 5,322,819 patents. They can be presented in the form of <<colourless>> glasses or coloured glasses. Their coloration or <<non-coloration>>, in the absence of specific colouring agents, does in fact depend upon the oxidation state of the copper within them; said oxidation state of the copper depending itself upon the melting temperature of the constituents of the glass, upon the partial oxygen pressure during said melting, upon the concentrations of polyvalent ions in the glass, upon the basicity of said glass, upon the reducing agent(s) content of said glass.

For the glass concerned, the following is generally observed a green-blue coloration, when said copper is found mainly in the state of cupric ions : $Cu^{++}$;

a red coloration, when said copper is found in the state of copper: $Cu^{(o)}$;

a <<non-coloration>>, when said copper is found in the state of cuprous ions: $Cu^+$.

It is obviously not excluded to incorporate colouring agents within said glasses, which colouring agents are intended to confer another coloration to them.

With reference to the preparation of the <<colourless>> glasses, there exists a real technical problem. The <<non-coloured>> glasses of the prior art always do in fact have a non-negligible residual yellow colour. This is strongly detrimental, especially in the context of specific uses of said glasses in which a strict transparency or a really colourless aspect is required.

Confronted with this technical problem of residual yellow coloration, the Applicant has developed novel inorganic glasses, of the type containing copper halides or copper cadmium halides, and having a sharp optical absorption cutoff between 370 nm and 425 nm, which are really <<colourless>>

In order to quantify this colourless character, i.e. the residual yellow coloration of an inorganic glass, the person skilled in the art is aware of the parameter: yellow index, which is notably measured according to the French Standard (NF): T51-067. Said French Standard is familiar to the person skilled in the art. According to this Standard, the yellow index is calculated by the formula:

$$(128 X-106 Z)/Y,$$

with (X,Y,Z) which represent the colour points of said glass, colour points which are measured by using the illuminant C. Since this parameter depends upon the specific properties of absorption of the glass and obviously upon the thickness of the glass concerned, all the values compared in the present text, with reference to the glasses of the invention as well as with reference to the glasses of the prior art, are done so under comparable conditions, i.e. with glass samples of 2 mm thickness, said glasses having the same wavelength at 1% transmission (having the same absorption UV cutoff).

It is of course that the value of said absorption UV cutoff (wavelength at which 1% transmission is observed, below which the glass absorbs at more than 99%, and above which the glass hardly absorbs any more, given the sharp character of the optical absorption cutoff) depends both upon the composition of the glass and upon the thermal treatment that it has undergone. Classically, the glasses in question are in fact generally obtained in three steps:

a first step of formulation, in which their constituents are mixed;

a second step of melting and of pouring into a mould, at the end of which the glass is obtained in the adequate shape;

SUMMARY OF THE INVENTION a third step of thermal post-treatment, during which the micro-crystals are prepared.

According to its first object, the present invention therefore relates to colourless inorganic glasses of the type containing copper halides or copper cadmium halides and having a sharp optical absorption cutoff between 370 nm and 425 nm. With reference to the qualifier <<colourless>>, said glasses of the invention can be analysed as an improvement to the <<colourless>> glasses according to the U.S. Pat. Nos. 5,281,562 and 5,322,819 patents.

Said colourless glasses of the invention essentially have:

the composition below, expressed in cationic percentages:

| | | |
|---|---|---|
| | 23–73% | $SiO_2$ |
| | 15–45% | $B_2O_3$ |
| | 0–24% | $Al_2O_3$ |
| | 0–12% | $Li_2O$ |
| | 0–20% | $Na_2O$ |
| | 0–12% | $K_2O$ |
| | 0–5% | $CaO + BaO + SrO$ |
| | 0.125–1% | $Cu_2O$ |
| | 0–1% | $CdO$ |
| | 0–5% | $ZrO_2$ |
| with | 0–1.75% | Cl ⎤ 0.25–2% Cl + Br |
| | 0–2% | Br ⎦ |
| and | 0–2% | F; | the Cl, Br and F contents being themselves expressed in percentages by weight of the total composition;

with an adequate amount of reducing agent(s) which is (are) advantageously selected from $SnO_2$, $As_2O_3$, $Sb_2O_3$, and mixtures thereof, in order to have mainly, in said glasses, the copper in the form of cuprous ions ($Cu^+$), and therefore glasses which have neither a red coloration, nor a blue green coloration;

and furthermore, a minimised residual yellow coloration, i.e. measured according to Standard T51-067 (NF) recalled above, the yellow indices below:

a yellow index of less than 1.3, advantageously of less than 1, for a glass having a UV cutoff (wavelength at 1% transmission, measured on an optical transmission curve on a sample of said glass of 2 mm thickness) between 370 and 395 nm;

a yellow index of less than 2.3, advantageously of less than 2, for a glass having a UV cutoff (wavelength at 1% transmission, measured on an optical transmission curve on a sample of said glass of 2 mm thickness) at 400 nm;

a yellow index of less than 4, advantageously of less than 3, for a glass having a UV cutoff (wavelength at 1% transmission, measured on an optical transmission curve on a sample of said glass of 2 mm thickness) at 405 nm;

a yellow index of less than 20, advantageously of less than 12, and more advantageously still of less than 8 for a glass having a UV cutoff (wavelength at 1% transmission, measured on an optical transmission curve on a sample of said glass of 2 mm thickness) at 411 nm;

a yellow index of less than 50, advantageously of less than 20, and more advantageously still of less than 12, for a glass having a UV cutoff (wavelength at 1% transmission, measured on an optical transmission curve on a sample of said glass of 2 mm thickness) at 415 nm.

BRIEF DESCRIPTION OF THE INVENTION

Figure 1:
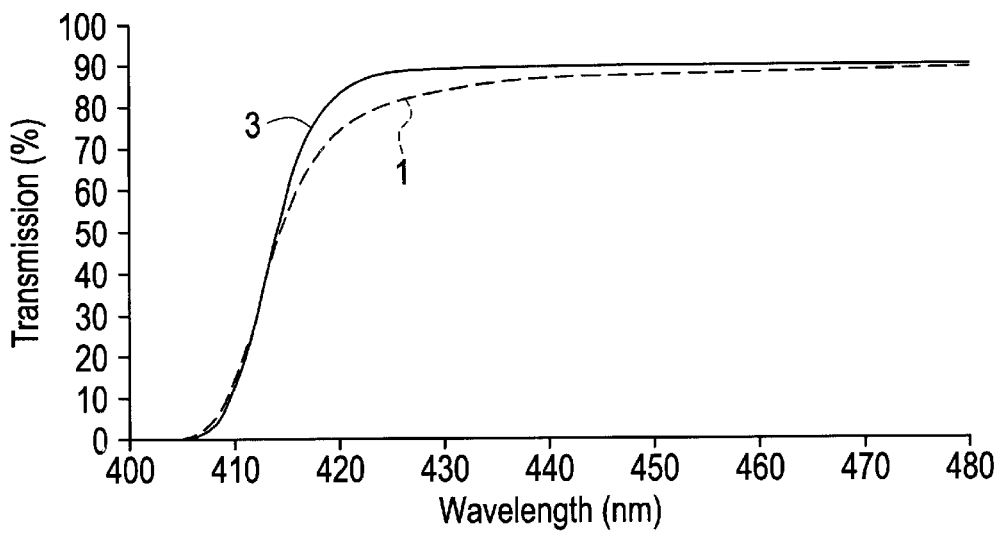
FIGS. 1, 3 and 4 are graphical representations showing transmission curves illustrating the invention.

The following can be specified with reference to the composition given above of the glasses of the invention.

Said glasses are essentially constituted of the elements listed, the term essentially presently signifying that they are constituted of at least 90% (cationic %) of said listed elements. The incorporation of other elements, especially ones known for conferring such and such a property to the final glass, are not in fact totally excluded from the context of the invention.

In any case, such other elements are not incorporated in significant amounts (but in amounts which are less than or equal to 5% cationic) and do not have a significant influence upon the properties sought after (sharp character of the absorption cutoff and yellow index value). In a purely illustrative way, the incorporation of $TiO_2$, PbO and/or niobium oxide can be specifically anticipated here in order to obtain glasses having higher indices. The incorporation of $TiO_2$ is not nevertheless truly recommended insofar as this element has a tendency to yellow the glass. The incorporation of $ZrO_2$ is much preferred. The incorporation of $MoO_3$ and $WO_3$ is also anticipated in order to adjust the index of said glasses, an incorporation in limited amounts (generally less than 0.5% cations) insofar as these elements have a tendency to render the glass photochromic.

The glasses of the invention contain as basic constituents: $SiO_2$ and $B_2O_3$; as well as, optionally: $Al_2O_3$, $Li_2O$, $Na_2O$, $K_2O$, CaO, BaO, SrO and $ZrO_2$.

Said optional constituents, when they are incorporated, generally are incorporated at at least 0.25, 0.5% (cationic).

$Al_2O_3$ is incorporated, in general, with reference to the chemical durability of the glasses, at the rate of at least 0.25% in cations, and more generally between 3 and 20% (cationic %). With reference to the technical problem faced,—that of the maximum decrease in the yellow index—it is seen later on that it is advantageously incorporated in a large amount: at more than 12%, even at more than 15% (cationic %).

The alkalines, Li, Na, K, are optionally incorporated in the amounts indicated and advantageously there is : $LiO_2$+$Na_2O$+$K_2O$ together, in cationic percentage, between 5 and 25%.

The alkaline-earths are optionally incorporated at the rate of : CaO+BaO+SrO≦5%. It is highly recommended to incorporate CaO and BaO together, in equal amounts, insofar as the CaO alone can give rise to opacity, while BaO alone can inhibit the precipitation of the micro-crystals of halides.

The halides that can be incorporated are chlorides, bromides and fluorides. The presence of fluorides is not indispensable; in contrast, it is imperative that at least 0.25% by weight of chlorides and/or bromides be incorporated in order to form the cuprous halides. It is advantageous to have, in percentage by weight, 0.5 to 1.5% of Cl+Br. The contents of halides are expressed in percentage by weight, insofar as it is impossible to express them in cationic percentage.

The rest of the composition has been expressed in cationic percentage in view of the disparity which exists between the atomic weights of the various cations incorporated.

With reference to the technical problem faced—that of the maximum decrease in the yellow index—it is seen later on that there is always advantageously a weight content of bromine which is greater than the weight content of chlorine.

The person skilled in the art will furthermore be aware of how to select or optimise the nature and the amount of the reducing agents to be used in order to obtain and maintain the copper in the state of cuprous ions.

The following contents, in cationic percentages, are recommended:

0–0.75% $SnO_2$,

0–1% $As_2O_3$ and/or $Sb_2O_3$.

The copper (the copper and the cadmium) are incorporated in the amounts indicated above. For what there is of copper, it is noted that the glasses of the invention advantageously contain, in cationic percentage, 0.125 to 0.5% of $Cu_2O$.

The glasses of the invention, which possess the cationic composition below, are furthermore characterised by their low yellow indices, as set forth above.

Upon consideration of the values set forth, the person skilled in the art will not miss grasping all the interest of the present invention.

As already specified above, according to a first embodiment, glasses of the invention have a weight content of bromine which is greater than their weight content of chlorine (Br>Cl). By adjusting this Br/Cl weight ratio, the Applicant has obtained surprising results (of yellow indices) which were in no way predictable upon reading the teaching of the US patents identified above.

According to advantageous variants of this first embodiment, there is, within the glasses of the invention a weight content of bromine which is at least 3 times greater than the weight content of chlorine (Br>3Cl);

a chlorine content which is nil (Cl=0).

The Applicant has furthermore demonstrated another interesting effect of the relative increase in the bromine content with respect to that of chlorine. The absorption can thus be displaced to higher wavelengths for a same thermal treatment. In other words, in accordance with the invention, a glass can be obtained which has a given absorption UV cutoff by using a thermal post-treatment under conditions which are less severe than according to the prior art.

As has also been specified above, according to another embodiment, the glasses of the invention contain a significant cationic content of alumina ($Al_2O_3$): greater than 12%, advantageously greater than 15%.

The Applicant has in fact discovered that said alumina content is also a determining element as to the improvement of the yellow index.

According to another embodiment, the colourless glasses of the invention contain an effective amount of at least one blue colouring agent. Said amount is effective in that it allows decreasing the residual yellow coloration of said glasses. It is obviously insufficient, in order to confer a blue coloration to said glasses, that the most transparent glasses as possible is sought after.

Said blue colouring agent, which can be incorporated, is advantageously selected from cobalt (Co) and neodymium (Nd). In a manner which is in no way limiting, it may be indicated here that the glasses of the invention can contain 1 to 500 ppm of cobalt or 50 ppm to 0.5% by weight of neodymium.

The three embodiments specified above (that it is possible to schematise in the following manner:

a) Br>Cl b) high $Al_2O_3$ c) addition of blue colouring agent(s))

can, within the context of said invention, be developed independently or jointly.

Notably, glasses $V_1$ and $V_2$ are particularly preferred in the sense of the invention which have the two compositions below, expressed in cationic percentages (except for the elements CuO, $SnO_2$, Cl, and Br, the contents of which are expressed in weight percentages, and Nd the content of which is expressed in ppm).

| cationic % | $V_1$ | $V_2$ |
|---|---|---|
| $SiO_2$ | 39.7 | 39.7 |
| $B_2O_3$ | 30.2 | 30.2 |

-continued

| cationic % | $V_1$ | $V_2$ |
|---|---|---|
| $Al_2O_3$ | 8.4 | 8.4 |
| $ZrO_2$ | 1.6 | 1.6 |
| $Li_2O$ | 7.3 | 7.3 |
| $Na_2O$ | 5.4 | 5.4 |
| $K_2O$ | 5.9 | 5.9 |
| BaO | 1.5 | 1.5 |
| CuO | 0.4 | 0.4 |
| Cl | 0.3 | — |
| Br | 0.6 | 0.8 |
| $SnO_2$ | 0.5 | 0.5 |
| Nd (ppm) | 520 | 520 |

Said glasses $V_1$ and $V_2$ are the subject of Examples 11 and 12 which are annexed to the present description.

According to a second object, the invention relates to any type of product which is manufactured from a glass according to the invention, and notably:

ophthalmic lenses, which it is obviously interesting to obtain as colourless as possible;

packaging devices of the flask and bottle type, which it is obviously interesting to have themselves absorbers of UV, colourless, and with a sharp optical absorption cutoff (without having need for any coating);

filters for liquid crystal projectors, that it is thus possible to have in glasses which are strongly absorbent up to 410 nm and which have an excellent transmission between 450 nm and 800 nm.

Figure 2:
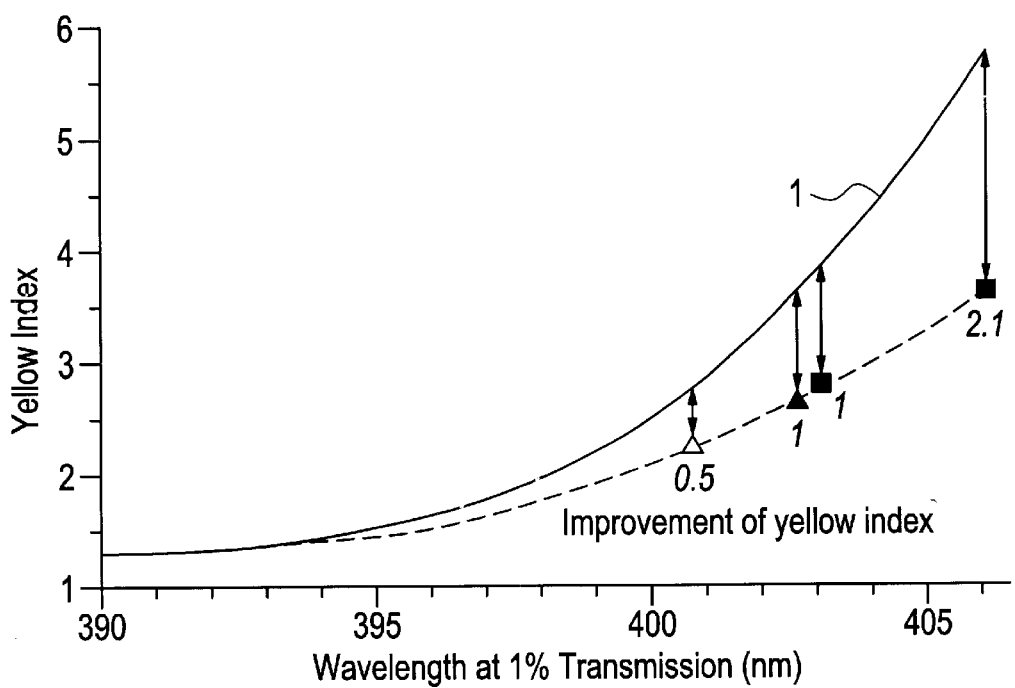
FIG. 2 is a graphical representation showing the variation in yellow index with wavelength for a prior art glass and a glass of the present invention.
Figure 3:
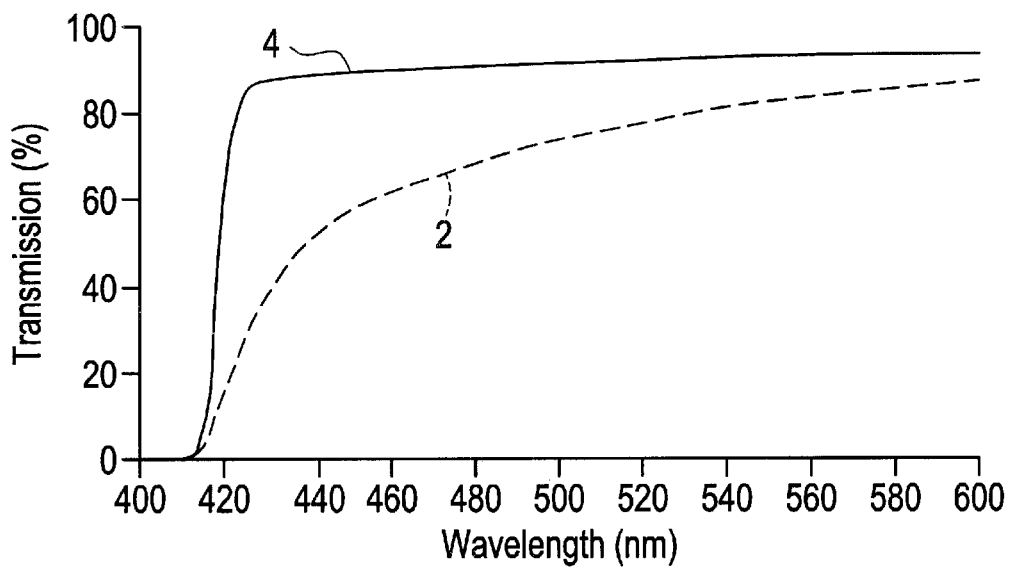
Figure 4:
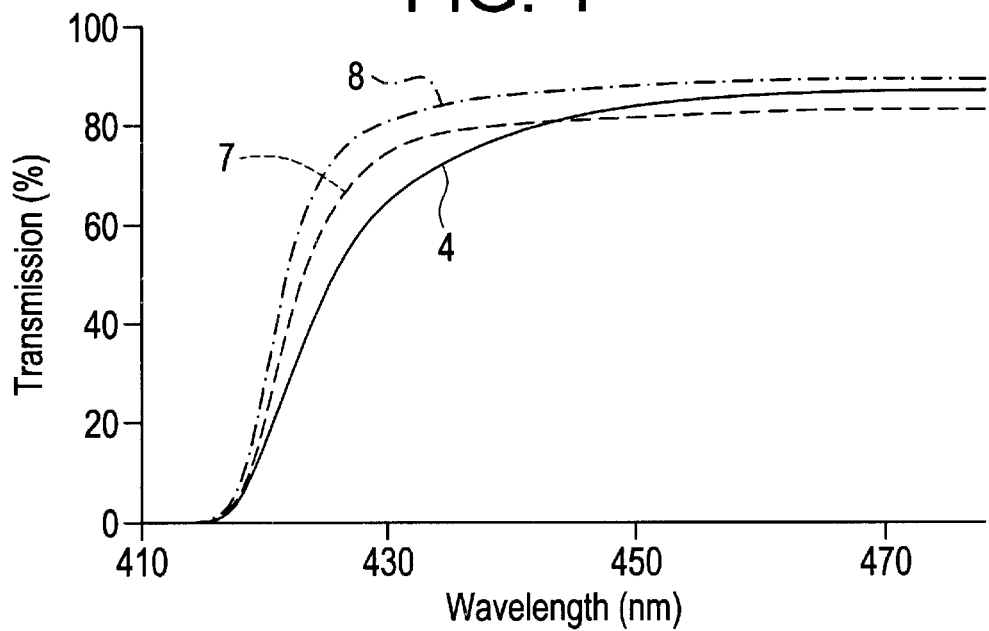

It is now proposed to illustrate the various aspects of the invention by the Examples below, to be considered with FIGS. 1 to 4 in Annex. FIGS. 1, 3 and 4 are transmission curves, while FIG. 2 shows the variations in the yellow index with wavelength.

The Applicant has prepared and tested glasses (Examples 1 to 12) the compositions of which are given in Tables I and II below:

compositions, expressed in weight percentages, in Table I compositions, expressed in cationic percentages (with the exception of the contents of Cl, Br, $SnO_2$ and CuO expressed in weight percentages), in Table II.

TABLE I

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | % by weight | | | | | | | | | | | |
| | Ref. Br/Cl = 0.86 | Br/Cl = 1.1 | Br/Cl = 3.1 | Cl = 0 | Br/Cl = 0.86 + 800 ppm Nd | Br/Cl = 1.4 | $Al_2O_3$ ↑ | $Al_2O_3$ ↑ | Br/Cl = 1.1 + 430 ppm Nd | Br/Cl = 1.1 + 520 ppm Nd | Br/Cl = 1.1 + 520 ppm Nd | Cl = 0 + 520 ppm Nd |
| $SiO_2$ | 47.1 | 48.5 | 46.4 | 45.9 | 47.2 | 46.9 | 36 | 33.6 | 48.3 | 48.5 | 48 | 48 |
| $B_2O_3$ | 22.2 | 20.9 | 22.6 | 22.8 | 22.7 | 21.5 | 26.7 | 26.8 | 21.3 | 21.1 | 21.5 | 21.5 |
| $Al_2O_3$ | 8.6 | 8.7 | 8.6 | 8.8 | 8.5 | 8.7 | 15.1 | 17.2 | 8.7 | 8.7 | 8.7 | 8.7 |
| $ZrO_2$ | 4 | 4.1 | 4 | 3.8 | 4 | 4 | 4 | 4 | 4 | 4 | 4 | 4 |
| $Li_2O$ | 2.2 | 2.2 | 2.3 | 2.6 | 2.3 | 2.3 | 2.1 | 2.2 | 2.2 | 2.2 | 2.2 | 2.2 |
| $Na_2O$ | 3.4 | 3.5 | 3.4 | 3.3 | 3.4 | 4 | 3 | 3 | 3.4 | 3.4 | 3.5 | 3.5 |
| $K_2O$ | 5.5 | 5.6 | 5.5 | 5.6 | 4.8 | 5.5 | 5.9 | 5.9 | 5.6 | 5.6 | 5.6 | 5.6 |
| BaO | 4.7 | 4.7 | 4.8 | 4.75 | 4.75 | 4.8 | 4.9 | 5 | 4.7 | 4.75 | 4.7 | 4.7 |
| CuO | 0.44 | 0.43 | 0.48 | 0.46 | 0.44 | 0.46 | 0.42 | 0.41 | 0.42 | 0.42 | 0.4 | 0.4 |
| Cl | 0.53 | 0.44 | 0.24 | — | 0.55 | 0.41 | — | — | 0.42 | 0.42 | 0.3 | — |
| Br | 0.46 | 0.453 | 0.76 | 0.95 | 0.47 | 0.58 | 0.75 | 0.54 | 0.46 | 0.46 | 0.6 | 0.8 |
| $SnO_2$ | 0.87 | 0.49 | 0.98 | 1 | 0.88 | 0.88 | 1.1 | 1.1 | 0.5 | 0.5 | 0.5 | 0.5 |
| Nd (ppm) | — | — | — | — | 800 | — | — | — | 430 | 520 | 520 | 520 |

TABLE II

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | cationic % | | | | | | | | | | | |
| | Ref. Br/Cl = 0.86 | Br/Cl = 1.1 | Br/Cl = 3.1 | Cl = 0 | Br/Cl = 0.86 + 800 ppm Nd | Br/Cl = 1.4 | $Al_2O_3 \uparrow$ | $Al_2O_3 \uparrow$ | Br/Cl = 1.1 + 430 ppm Nd | Br/Cl = 1.1 + 520 ppm Nd | Br/Cl = 2 + 520 ppm Nd | Cl = 0 + 520 ppm Nd |
| $SiO_2$ | 38.7 | 39.9 | 38.1 | 37.2 | 38.8 | 38.5 | 29.6 | 26.6 | 39.7 | 39.8 | 39.7 | 39.7 |
| $B_2O_3$ | 31.5 | 29.7 | 32.0 | 31.9 | 32.2 | 30.5 | 37.8 | 36.6 | 30.2 | 29.9 | 30.2 | 30.2 |
| $Al_2O_3$ | 8.3 | 8.4 | 8.3 | 8.4 | 8.2 | 8.4 | 14.6 | 16.1 | 8.4 | 8.4 | 8.4 | 8.4 |
| $ZrO_2$ | 1.6 | 1.6 | 1.6 | 1.5 | 1.6 | 1.6 | 1.6 | 1.5 | 1.6 | 1.6 | 1.6 | 1.6 |
| $Li_2O$ | 7.3 | 7.3 | 7.6 | 8.5 | 7.6 | 7.6 | 6.9 | 7.0 | 7.3 | 7.3 | 7.3 | 7.3 |
| $Na_2O$ | 5.4 | 5.6 | 5.4 | 5.2 | 5.4 | 6.4 | 4.8 | 4.6 | 5.4 | 5.4 | 5.4 | 5.4 |
| $K_2O$ | 5.8 | 5.9 | 5.8 | 5.8 | 5.0 | 5.8 | 6.2 | 6.0 | 5.9 | 5.9 | 5.9 | 5.9 |
| BaO | 1.5 | 1.5 | 1.5 | 1.5 | 1.5 | 1.5 | 1.6 | 1.6 | 1.5 | 1.5 | 1.5 | 1.5 |
| CuO | 0.44 | 0.43 | 0.48 | 0.46 | 0.44 | 0.46 | 0.42 | 0.41 | 0.42 | 0.42 | 0.4 | 0.4 |
| Cl | 0.53 | 0.44 | 0.24 | 0.00 | 0.55 | 0.41 | 0.00 | 0.00 | 0.42 | 0.42 | 0.3 | — |
| Br | 0.46 | 0.45 | 0.76 | 0.95 | 0.47 | 0.58 | 0.75 | 0.54 | 0.46 | 0.46 | 0.6 | 0.8 |
| $SnO_2$ | 0.87 | 0.49 | 0.98 | 1.00 | 0.88 | 0.88 | 1.10 | 1.10 | 0.50 | 0.50 | 0.5 | 0.5 |
| Nd ppm | — | — | — | — | 800 | — | — | — | 430 | 520 | 520 | 520 |

The glasses having the composition of Example 1 (obtained after various thermal post-treatments) are glasses of the prior art, according to U.S. Pat. No. 5,281,562. The glasses having the composition of Examples 2 to 12 are glasses of the invention, characterised by a very sharp optical absorption cutoff, between 370 and 425 nm, and by a low yellow index.

Each glass is characterised by its wavelength at 1% transmission (said glass absorbing at more than 99% all the lower wavelengths), measured on a sample of 2 mm thickness (wavelength at the UV cutoff of the absorption curve) and by its yellow index calculated according to the Standard T51-067. As shown in FIG. 2, and commented on earlier in the text, said yellow index depends upon the position of the absorption UV cutoff. In order to present comparable results, the Applicant has measured the yellow indices on glasses having the same wavelength at 1% transmission.

The Standard T51-067 is a French Standard and familiar to the person skilled in the art. Its method of measurement was specified supra in the present text.

The results presented below, obtained with the glasses having the composition of Example 1 (prior art) and the glasses having the compositions of Examples 2, 3, 4 and 6 (invention) show the interest in having, in accordance with one of the teachings of the invention, a weight content of bromine which is greater than that of chlorine.

This Br/Cl ratio, to the advantage of the Br (Br>Cl), has, as indicated in the general description above, two effects.

$1^{st}$ effect : For a same thermal treatment of the glass, the absorption by the glass starts off at a higher wavelength. Thus, for glasses according to Examples 1 and 3, which have undergone the same thermal treatment, (585° C., for 30 minutes), the wavelength at 1% transmission was measured. The results obtained are given in Table III below.

TABLE III

| Example | Br/Cl Weight ratio (with Br + Cl = 1% by weight) | Wavelength at 1% transmission |
|---|---|---|
| 1 | 0.86 | 401 nm |
| 3 | 3.1 | 406 nm |

This is particularly advantageous insofar as, according to the invention, it is therefore possible to obtain glasses which are as efficient as those of the prior art, in terms of sharp optical absorption cutoff or yellow index, but this by employing a less intense heating.

$2^{nd}$ effect : The transmission curve is sharper, which induces a better transmission in the visible and therefore a lower yellow index.

a) This is confirmed upon considering the curves given in the annexed FIG. 1, transmission curves (as a function of the wavelength), for two glasses of Examples 1 and 3, which show a same wavelength at 1% transmission (406 nm), with various Br/Cl weight ratios.

The glass of the invention (according to Example 3, with Br/Cl=3.1 and Br+Cl=1% by weight) exhibits a steeper slope of its transmission curve than that of the glass of the prior art (according to Example 1, with Br/Cl=0.86 and Br+Cl=1% by weight), and this induces a much better yellow index: 3.6 for the glass of the invention, 5.5 for the glass of the prior art.

b) The generalisation of this second effect is demonstrated by the results represented in FIG. 2 (FIG. 2 which shows the variations in yellow index, given up the ordinate, as a function of the wavelength at 1% transmission, given along the abscissa).

The continuous curve of said FIG. 2 shows the dependence of the yellow index as a function of the UV absorption of glasses of the prior art (glasses according to Example 1, with Br/Cl=0.86 and Br+Cl=1% by weight).

The dashed curve has been interpolated between the point values corresponding to the glasses of the invention:

glass of Example 2: Br/Cl=1.1 and Br+Cl=1% by weight, glass of Example 6: Br/Cl=1.4 and Br+Cl=1% by weight, glass of Example 3: Br/Cl=3.1 and Br+Cl=1% by weight.

The improvement according to the invention, of the yellow index value is quantified by the difference between the values of the yellow index of the glasses of the invention and glasses of the prior art, for a same value of wavelength at 1% transmission (i.e. for similar properties of UV absorption). Upon considering said FIG. 2, it is realised that, according to the invention, for a glass having a wavelength of 400 nm at 1% transmission, an improvement of the yellow index by at least 0.5 is obtained.

This improvement in the yellow index is of at least 2.1 for glasses having a wavelength of 406 nm at 1% transmission.

c) This second effect is therefore all the more marked because the glass concerned exhibits a high wavelength at 1% transmission (absorbs all the wavelengths up to such a high wavelength), for example of 410 nm.

This affirmation is corroborated by the curves in FIG. 3 which show that by increasing the temperature of the thermal treatment of the glass, with a high Br/Cl ratio (glass according to Example 2, with Br/Cl=1.1 and Br+Cl=1% by weight; but above all glass according to Example 4 with Cl=0 (Br/Cl=∞) and Br=0.95% by weight), the wavelength at 1% transmission is as high as 412 nm and this, with an absorption cutoff as sharp as said rapport Br/Cl is high.

The yellow index of the glass of Example 4 (very high Br/Cl) is only of 5.3 while that of the glass of Example 2 (Br/Cl=1.1) is of 36.7.

The results given below in Tables IV, V and VI show the positive effect of the incorporation of a blue colouring agent (incorporation in an adequate amount: which is effective for decreasing the residual yellow coloration, obviously insufficient for conferring a blue coloration insofar as interest is shown by colourless glasses).

TABLE IV

| Example | Neodymium content (ppm) | Yellow index | % transmission between 400 and 800 nm |
|---|---|---|---|
| 2 | 0 | 2.3 | 91.8 |
| 9 | 430 | 1.8 | 91.4 |
| 10 | 520 | 1.7 | 91.36 |

TABLE V

| Example | Neodymium content (ppm) | Yellow index | % transmission between 400 and 800 nm |
|---|---|---|---|
| 1 | 0 | 2.77 | 91 |
| 5 | 800 | 1.34 | 90.4 |

The glasses of Table IV and Table V are respectively similar in terms of formulation. The results given as regards the yellow index can be compared insofar as said five glasses have a same absorption UV cutoff (a same wavelength at 1% transmission) at 401 nm.

Said results show that the incorporation of neodymium enables strongly decreasing the yellow index without a major impact on the total percentage of transmission.

Similarly, the following results were obtained with glasses according to Example 1 (prior art) and according to Example 5.

TABLE VI

| Example | Wavelength at 1% transmission (nm) | Yellow index |
|---|---|---|
| 1 | 391 | 1.3 |
| 5 | 391 | 0.4 |

A few results are also proposed below for glasses according to Examples 11 (11a, 11b, 11c) and 12 (12a, 12b, 12c), which are particularly preferred glasses.

Within them, both a Br/Cl ratio to the advantage of the Br and a blue colouring agent (neodymium) in an effective amount within the sense of the invention, are found.

The results given in Table VII below have been obtained with said glasses.

TABLE VII

| Glass | Wavelength at 1% transmission (nm) | Yellow index |
|---|---|---|
| 11a | 391 | 0.8 |
| 11b | 401 | 1.3 |
| 11c | 412 | 6.5 |
| 12a | 392 | 0.8 |
| 12b | 402 | 1.5 |
| 12c | 412 | 5.9 |

It is now proposed to illustrate, with glasses according to Examples 4, 7 and 8, with reference to FIG. 4, the interest in having, in accordance with another of the teachings of the invention, a relatively high alumina content value.

More the alumina content is increased, more the transmission curve has a pronounced sharp character (see FIG. 4), and the lower the yellow index is (see Table VII below).

TABLE VIII

| Example | Cationic content of alumina (%) | Wavelength at 1% transmission (nm) | Yellow index |
|---|---|---|---|
| 4 | 8.4 | 415 | 15 |
| 7 | 14.6 | 417 | 9.7 |
| 8 | 16.1 | 417 | 9.1 |

The results, as regards the yellow index, are all the better according to the invention because they are obtained at a higher wavelength at 1% transmission (417>415).

These good results appear in FIG. 4: more the alumina content is increased, more the slope of the curve (Transmission=f (wavelength)) is steep, which leads, for a <<same>> position of the transmission UV cutoff (417≈415 nm), to a less yellow glass.

Upon considering the Tables above and the Annexed Figures, the person skilled in the art will not miss grasping all the interest of the presently claimed invention.

What is claimed is:

1. Colourless inorganic glasses containing copper halides or copper cadmium halides and having a sharp optical absorption cutoff between 370 nm and 425 nm;

consisting essentially of, expressed in cationic percentages:

| | | |
|---|---|---|
| | 23–73% | SiO$_2$ |
| | 15–45% | B$_2$O$_3$ |
| | 0–24% | Al$_2$O$_3$ |
| | 0–12% | Li$_2$O |
| | 0–20% | Na$_2$O |
| | 0–12% | K$_2$O |
| | 0–5% | CaO + BaO + SrO |
| | 0.125–1% | Cu$_2$O |
| | 0–1% | CdO |
| | 0–5% | ZrO$_2$ |
| with | 0–1.75% | Cl |
| | 0–2% | Br |
| and | 0–2% | F; | with 0.25–2% Cl + Br and the weight content of Br exceeding that of Cl (Br > Cl)

the Cl, Br and F contents being expressed in percentages by weight of the total composition;

with an effective amount of at least one reducing agent selected from SnO$_2$, As$_2$O$_3$, Sb$_2$O$_3$, and mixtures thereof, in order to have mainly, in said glasses, the copper in the form of cuprous ions (Cu$^+$), and thereby providing glasses which have neither a red coloration, nor a blue green coloration;

and having a minimal yellow coloration whereby they have, according to the Standard T 51-067 (NF):

a yellow index of less than 1.3 for a 2 mm. thick glass having a UV cutoff wavelength at 1% transmission between 370 and 395 nm;

a yellow index of less than 2.3 for a 2 mm. thick glass having a UV cutoff wavelength at 1% transmission at 400 nm;

a yellow index of less than 4 for a glass having a UV cutoff wavelength at 1% transmission, at 405 nm;

a yellow index of less than 20 for a glass having a UV cutoff wavelength at 1% transmission at 411 nm;

a yellow index of less than 50 for a 2 mm. thick glass having a UV cutoff wavelength at 1% transmission at 415 nm.

2. The colorless inorganic glasses according to claim 1 wherein the weight content of bromine is at least three times greater than the content of chlorine (Br>3Cl).

3. The colorless inorganic glasses according to claim 2 wherein they do not contain any chlorine (Cl=0).

4. The colorless inorganic glasses according to claim 1 wherein their cationic content of aluminum (Al$_2$O$_3$) is greater than 12%.

5. The colorless inorganic glasses according to claim 1 wherein they contain an effective amount of at least one blue coloring agent selected from the group consisting of cobalt and neodymium.

6. The colourless inorganic glasses acccording to claim 5, wherein they contain 1 to 500 ppm of cobalt or 50 ppm to 0.5% by weight of neodymium.

7. A glass article wherein the article is composed of a glass according to any one of claims 1 to 6.

8. The colorless inorganic glasses according to claim 2 wherein their weight content of bromine thereof is at least three times greater than the weight content of chlorine (Br>3Cl).

9. The colorless inorganic glasses according to claim 4 wherein their cationic content of aluminum (Al$_2$O$_3$) is greater than 15%.

10. The colorless inorganic glasses according to claim 2 wherein they contain an effective amount of at least one blue coloring agent selected from the group consisting of cobalt and neodymium.

\* \* \* \* \*